Nov. 18, 1958   G. A. LYON, JR   2,860,922
WHEEL COVER
Filed Jan. 3, 1955   5 Sheets-Sheet 1
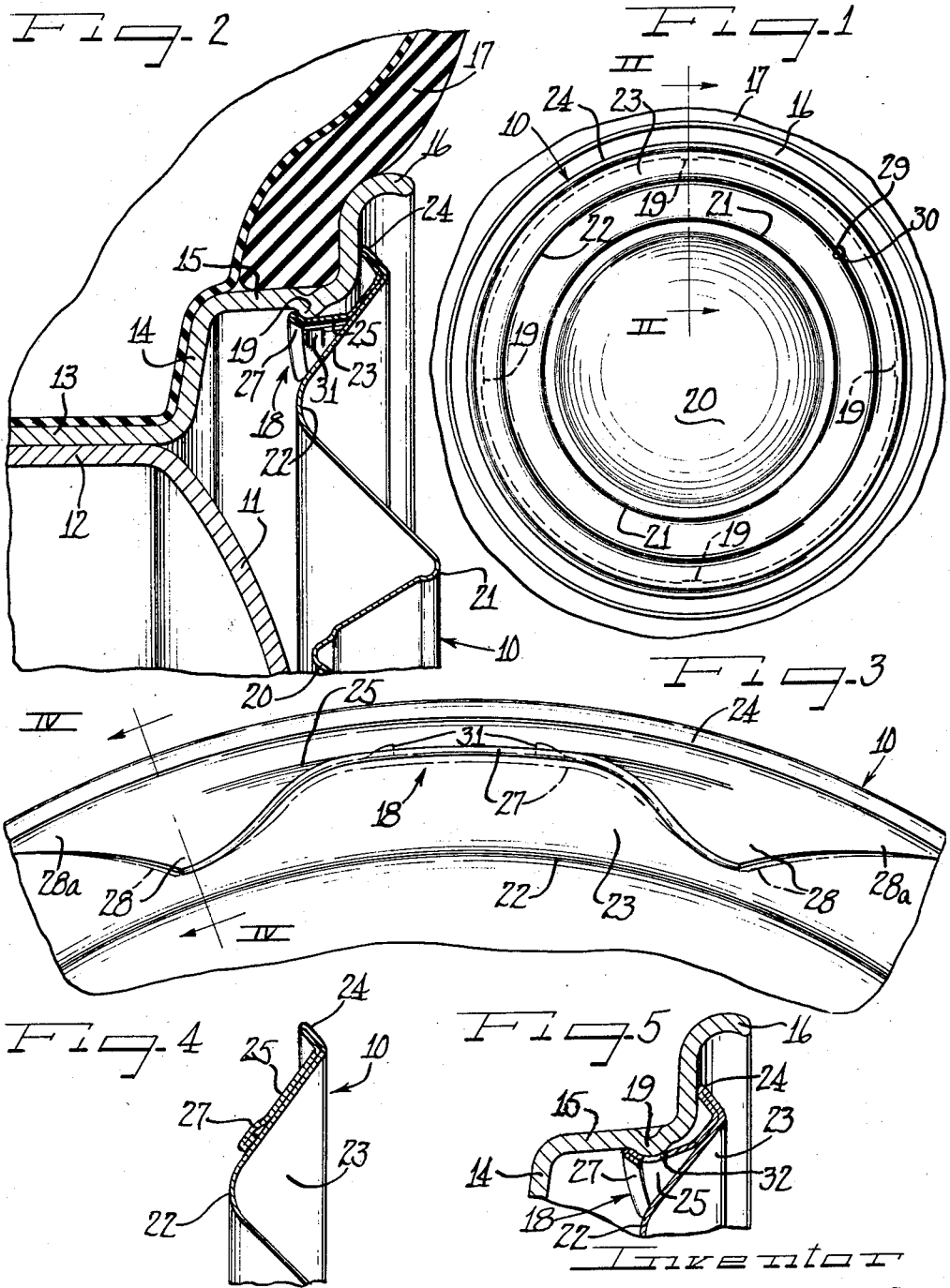
George A. Lyon, Jr.

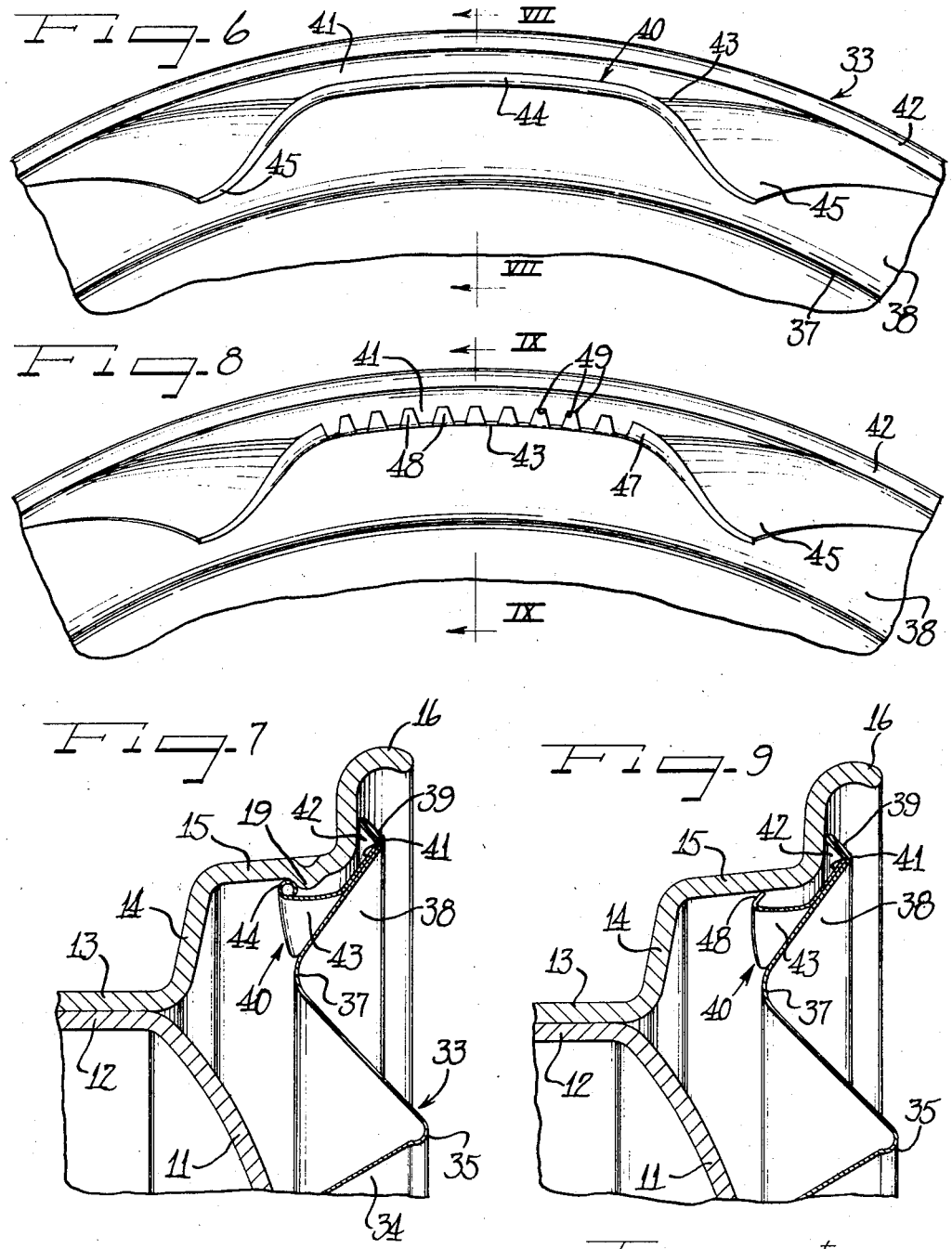

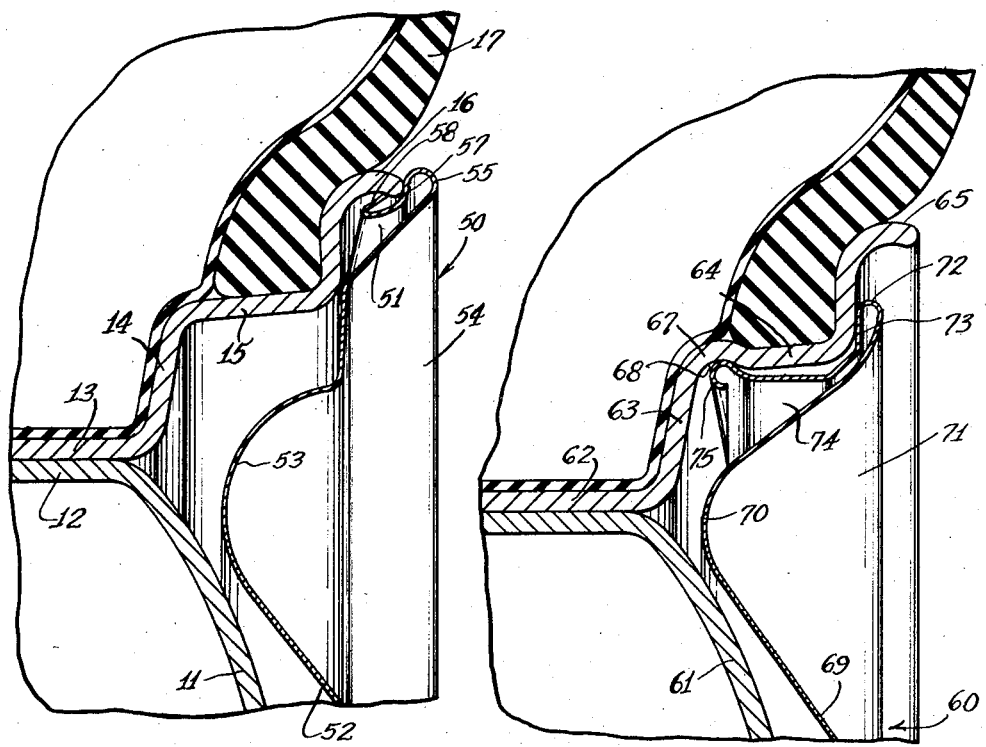

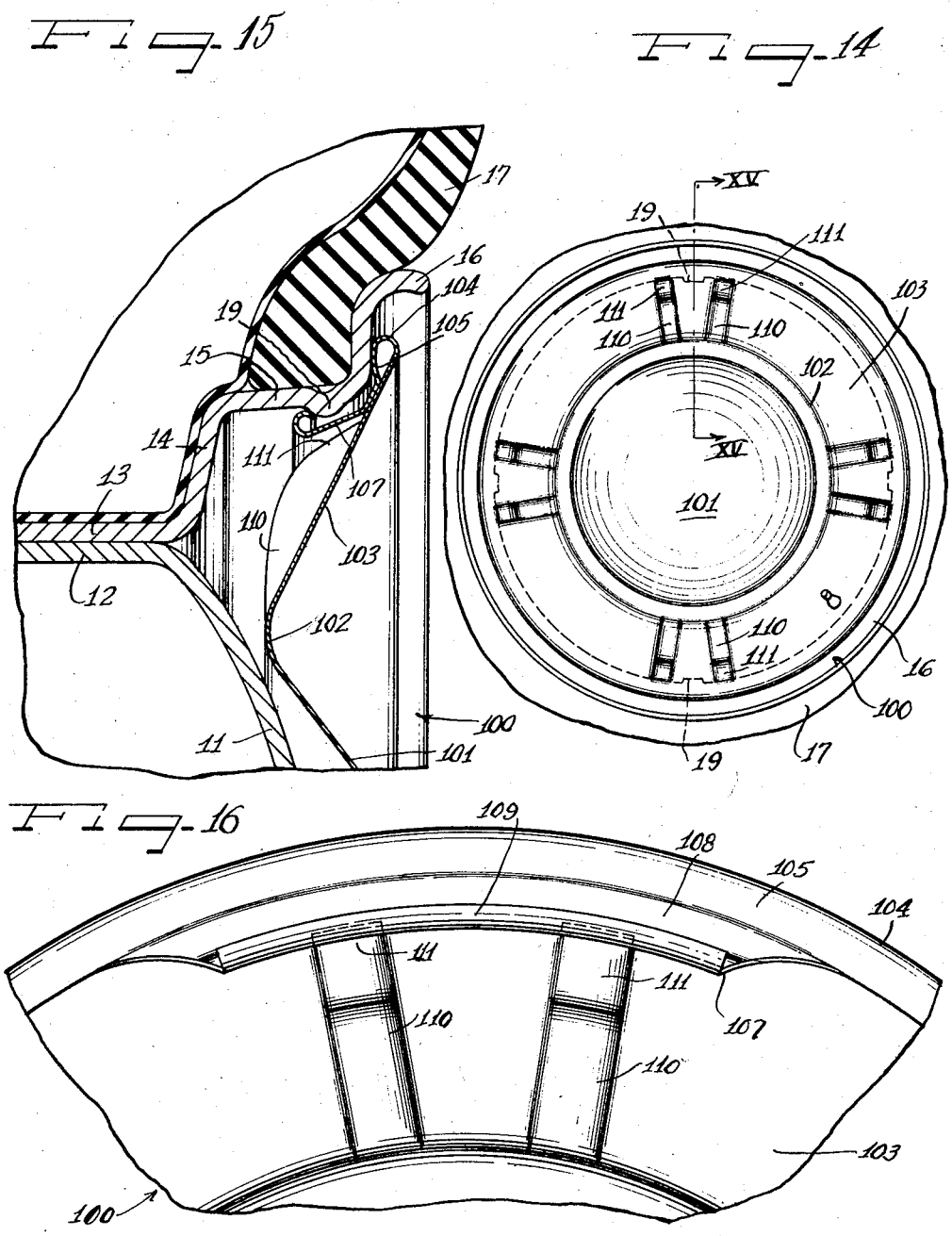

Nov. 18, 1958     G. A. LYON, JR     2,860,922
WHEEL COVER
Filed Jan. 3, 1955     5 Sheets-Sheet 5
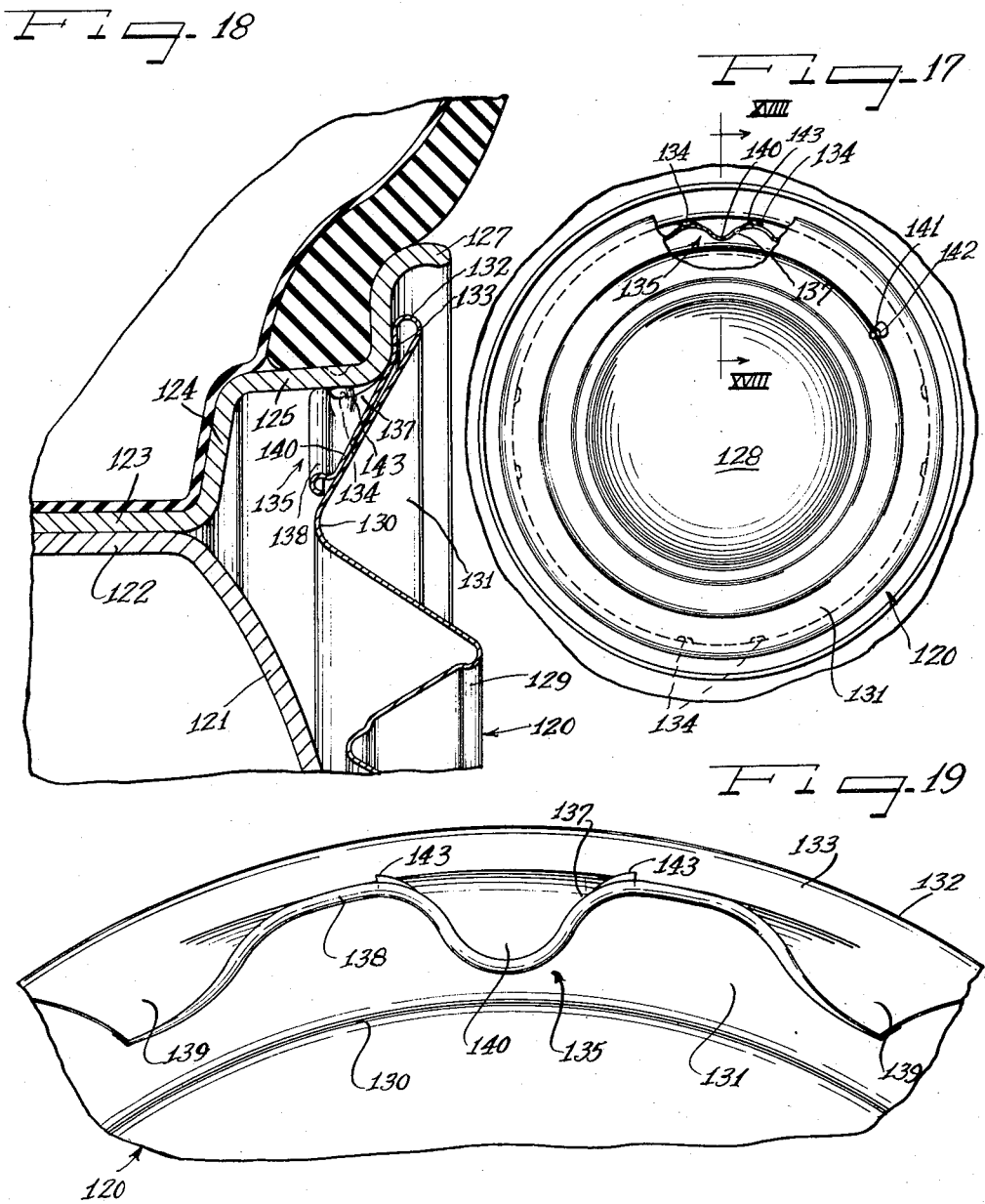
Inventor
George A. Lyon, Jr.

United States Patent Office 2,860,922
Patented Nov. 18, 1958

2,860,922
WHEEL COVER

George Albert Lyon, Jr., Birmingham, Mich., assignor to Lyon Incorporated, Detroit, Mich., a corporation of Delaware Application January 3, 1955, Serial No. 479,554

23 Claims. (Cl. 301—37)

The present invention relates to improvements in wheel structures and more particularly concerns the ornamental and protective covering of the outer sides of vehicle wheels.

In automotive accessories, price is generally an important consideration, especially in periods of normal competitive activity in the automobile industry. Wheel covers fall within this category.

In automotive wheel covers a substantial cost factor resides in the means whereby the covers are retained on the wheels. The modern trend toward ever higher horsepower and larger and heavier automobiles compels the vehicle road wheels to withstand great stresses and strains, and the wheels are constructed to have more or less resilient give or yieldability to meet the various operating forces and pressures safely.

Since the wheel covers are entirely dependent upon some sort of interengagement with the wheels, which will successfully withstand all weaving or resilient movements of the supporting wheel part, as well as vibratory and jarring movements of the supporting wheel part and possible curbing or other extraneous pressures, and the like, serious attention to the retaining means is required.

An important object of the present invention is to provide novel, efficient, low cost retaining means for vehicle wheel covers.

Another object of the invention is to provide an improved wheel structure providing novel retaining finger means for retention of a wheel cover.

A further object of the invention is to provide novel low cost retaining finger means for wheel covers.

Still another object of the invention resides in the provision of flexible retaining finger means for wheel covers equipped to be self-tensioning in service.

It is still another object of the invention to provide a novel wheel cover construction with retaining fingers having improved means for service tensioning thereof so as to assure thorough, efficient press-on, pry-off application of the cover to a wheel.

Other objects, features and advantages of the present invention will be readily apparent from the following detailed description of certain preferred embodiments thereof taken in conjunction with the accompanying drawings, in which:

Figure 1 is an outer side elevational view of a wheel structure embodying features of the invention.

Figure 2 is an enlarged fragmentary radial sectional view taken substantially on the line II—II of Fig. 1.

Figure 3 is a fragmentary rear elevational view of the cover of Figs. 1 and 2.

Figure 4 is a fragmentary sectional detail view taken substantially on the line IV—IV of Fig. 3.

Figure 5 is a fragmentary radial sectional view through a wheel structure, similar to Fig. 2 but showing a modification.

Figure 6 is a fragmentary rear elevational view of another modified form of the wheel cover.

Figure 7 is a fragmentary radial sectional view through the cover of Fig. 6, taken substantially on the line VII—VII and showing the cover as applied to a vehicle wheel.

Figure 8 is a fragmentary rear elevational view of still another modification of the cover.

Figure 9 is a fragmentary radial sectional view taken substantially on the line IX—IX of Fig. 8 and showing the cover as applied to a vehicle wheel.

Figure 10 is a fragmentary radial sectional view through a wheel structure showing a further modification.

Figure 11 is a fragmentary radial sectional view through a wheel structure showing yet another modification.

Figure 12 is a fragmentary rear elevational view of yet another modified form of the invention.

Figure 13 is a fragmentary radial sectional view through a wheel structure depicting yet another modification.

Figure 14 is an outer side elevational view of a wheel structure showing a yet further modification.

Figure 15 is a fragmentary enlarged radial sectional view taken substantially on the line XV—XV of Fig. 14.

Figure 16 is a fragmentary rear elevational view of the cover of Figs. 14 and 15.

Figure 17 is a fragmentary outer side elevational view of a still further modified form of the invention with a portion broken away to show details of structure therebehind.

Figure 18 is a fragmentary radial enlarged sectional view taken substantially on the line XVIII—XVIII of Fig. 17; and—

Figure 19 is a fragmentary rear elevational view of the cover of Figs. 17 and 18.

Referring first to Figs. 1–4, a wheel structure including a wheel cover 10 is shown wherein the cover is applied to the outer side of a vehicle wheel such as an automobile wheel having a disk spider wheel body 11 provided with a marginal generally axially extending flange 12 attached in suitable fashion to a base flange 13 of a tire rim. From the base flange of the tire rim extends a generally radially outwardly directed and axially outwardly facing side flange 14 merging with a generally axially outwardly and radially outwardly sloping intermediate flange 15 to which is joined a generally radially outwardly and then axially outwardly turned terminal flange 16. The flanges of the tire rim are organized in such a manner as to support a pneumatic tire and tube assembly 17 or a tubeless tire, as may be preferred.

According to the present invention, the cover 10 is constructed as a circular member for disposition at the outer side of the wheel and is provided with resilient retaining finger means 18 therebehind engageable retainingly with the intermedaite flange 15 of the tire rim, and in this instance, more particularly with retaining bumps 19 pressed in the intermediate flange to project generally radially inwardly adjacent juncture of such flange with the terminal flange portion 16 of the tire rim. To this end, the cover 10 is made from suitable material such as metal or plastic, and may conveniently be formed from sheet metal such as stainless steel, brass, aluminum alloy, or the like, which may be stamped or drawn to shape.

While the cover 10 may be provided with various outer shapes or contours and may comprise a multi-part assembly, or an annular trim, it is shown as a one piece sheet metal member having a central crown portion 20 for overlying the central portion of the wheel body 11 and bordered by an annular axially outwardly projecting ornamental and reinforcing rib portion 21. At the radially outer side of the rib 21 is provided an annular, transversely dished portion 22 which in assembly is adapted to overlie the side flange 14 of the tire rim spaced radially inwardly from the intermediate flange 15 and defined at its radially outer side by a generally radially and axially outwardly sloping marginal portion 23 of a diameter to overlie the intermediate flange 15 and at least the juncture portion of the tire rim between the intermediate and terminal flanges. Defining the radially outer extremity of the marginal cover portion 23 is a turned, annular generally radially outwardly and axially inwardly directed flange-fold reinforcing and finishing bead-like formation 24. In assembly of the cover with the wheel the extremity formation 24 is adapted as seen in Fig. 2, to bear as a stop against the radially extending portion of the terminal flange 16 of the tire rim to thereby support the cover 10 free from the wheel body 11 and thus afford clearance for substantial manufacturer's axial displacement tolerance variation in the assembly of the tire rim and wheel body.

The retaining fingers 18 extend from the underturned marginal bead flange 24 and in actual practice may be derived from four corners of a square blank of sheet material turned under and behind the marginal portion 23 of the cover. Thereby, the cover can be made with practically no wastage of material and a blank can be utilized that is of square dimensions just great enough to provide material for the full diameter of the cover, inclusive of the underturned marginal bead flange 24. With four of the retaining bumps 19 on the tire rim equidistantly spaced, it will be appreciated that just the proper number of retaining fingers 18 will be derived from the material at the four corners of the original blank.

Each of the retaining fingers 18 comprises an extension from the underturned portion of the marginal bead flange 24, with a connecting portion of the finger adjacent the bead flange 24 bearing directly against the back of the radially outer section of the marginal portion 23 of the cover and extending generally radially and axially inwardly clear of the shoulder at juncture of the intermediate and terminal flanges of the tire rim. Thence, the retaining fingers 18 extend generally axially inwardly divergently relative to the back of the cover portion 23 to provide resiliently flexible finger body portions 25 of substantial width and lying on a diameter somewhat less than the inside diameter of the axially outer portion of the intermediate rim flange 15 in the area thereof having the retaining bumps 19, but to a larger diameter than the diameter described about the tips or innermost projecting portions of the retaining bumps.

At their inner extremities, the retaining finger bodies 25 are provided with turned, resilient, reinforced, bead-like edge portions 27. In this form of the invention, the edge portions 27 are turned back upon themselves toward the radially inner side of the retaining finger body extremities, and are angled to project generally radially outwardly and axially inwardly to a somewhat larger diameter than the diameter described about the retaining finger bodies 25 to provide bump engaging terminal means on the fingers. By the turning over of the finger terminal portions, the edge extremities are rounded off so that in the application of the cover 10 to the wheel, the angled terminals 27 will smoothly and easily cam over the axially outer side of the retaining bumps 19 and upon passing the tips of the bumps will snap behind the bumps and tend to cam axially inwardly and radially outwardly thereon toward the adjacent portion of the tire rim intermediate flange 15. As a result, the cover is drawn by the retaining fingers generally axially inwardly until the radially outer extremity bead 24 of the cover is drawn firmly against the tire rim flange portion opposing the same.

For removing the cover from the wheel, a pry-off tool is inserted behind the outer marginal bead 24 and pry-off tool leverage applied thereto for resiliently disengaging the retaining finger terminals 27 from the bumps 19.

Greatly enhanced resilient stiffness is afforded for the retaining fingers 18, while nevertheless permitting ample operative radially resilient flexure for retaining and pry-off coaction with the bumps 19 by having the retaining finger terminals 27 resiliently tensionable not only by the generally axially divergent portions of the respective retaining finger bodies 25, but also by the provision of means for resiliently yieldably backing up the fingers against adjacent portions of the body of the cover. To this end, the retaining fingers 18 and the marginal portion 23 of the cover have portions at respectively opposite sides of the fingers 18 in bottomed, thrusting abutment for thereby resisting substantially radially inward flexing of the retaining finger bodies 25 and thereby also the retaining bump engaging portions of the finger terminals 27. Conveniently and efficiently this is accomplished herein by having the finger bodies 25 arched generally circumferentially of the cover, with the opposite side portions of the fingers providing frictionally slidable wing-like flange shoulders 28 (Fig. 3) shaped to bottom or thrust broadside against the opposing inner face of the cover body portion 23. In order to enhance resilience of the structure, the turned, reinforced finger extremity 27 merges continuously at its opposite ends into the respective shoulder flanges 28 to bear against the cover marginal portion 23 (Fig. 4).

As a result of the turned-in thrust shoulder flanges 28, substantial resistance to resilient axially inward deflection of the retaining fingers 18 is provided for, in addition to the inherent resilience of the fingers due to resilience of the material, work hardening or other hardening thereof, and the resilient reinforcement afforded by the turned, more or less beaded retaining terminal edge structure 27. In response to radially inward pressures against the retaining terminal 27 or the body portion 25 of one of the fingers 18, as when the cover is assembled with the wheel and with the fingers engaging the retaining bumps 19, not only the outwardly convexly arched terminal portion of the finger may flex inwardly, but the thrust shoulder flanges 28 can yield resiliently laterally, and slide on the opposing shoulder provided by the cover marginal portion 23, as shown in dot-dash outline in Fig. 3. At the same time, substantial flaring body portions 28a of the shoulder flanges 28 extending toward attachment with the underturned marginal flange bead 24 increase resistance to sliding lateral displacement of the inner portions of the shoulder flanges. However, the flaring body portions 28a will yield by resiliently buckling inwardly under substantial radially inward deflectional force against the finger 18 and, thus, lateral movement of the shoulder flanges 28.

Since it is desirable to prevent turning of the cover 10 relative to the wheel by reason of service torque forces, so as to prevent distortion of a valve stem 29 which may project through an appropriate valve stem aperture 30 in the cover, anti-turn means are preferably provided on at least one of the retaining fingers 18 to coact with the associated retaining bump 19 in assembly. Herein the anti-turn means comprise a pair of circumferentially spaced opposing, struck-out lugs 31 on the finger body 25 and projecting generally radially outwardly. The opposing edges of the lugs 31 coact with the adjacent sides of the associated retaining bump to resist turning of the cover in either rotary direction.

Instead of struck-out turn-preventing lugs, at least one of the retaining fingers 18 may be provided with a socket into which one of the retaining bumps 19 is adapted to fit in assembly. Thus, as seen in the modification of Fig. 5, a socket 32 may be provided in the body 25 of the retaining finger. In this instance the socket 32 comprises an aperture of suitable size. Other elements of the wheel structure as shown in Fig. 5 may be the same as shown in Fig. 2 and accordingly similar reference numerals identify similar parts.

In the form of the invention shown in Figs. 6 and 7, the various elements of the wheel body and tire rim are identical with those of Fig. 2 and therefore are similarly identified. However, a wheel cover 33 of generally similar construction but slightly modified with respect to the retaining finger means is provided. To this end the cover 33 comprises a sheet metal plate having a central portion 34, an annular axially outwardly directed rib-like formation 35 surrounding the same and disposed radially inwardly from an annular dished cover portion 37 for overlying the side flange 14 of the tire rim and provided at its radially outer side with a generally radially and axially outwardly sloping, oblique annular marginal cover portion 38. At its outer extremity the marginal portion 38 is provided with a generally inwardly turned angular hollow bead-like edge flange formation 39.

Cover retaining flanges or fingers 40 are provided on the cover 33 for engagement with the retaining bumps 19. Each of the retaining fingers 40 has an attachment flange structure 41 nested against the cover portion 38 and attached to an underturned flange 42 of the edge formation 39. Of course, the fingers 40 as well as the finger flanges 18 may be formed as separate elements or as parts of a ring, either split or continuous and stamped or rolled to shape and then interlocked with the marginal bead structure of the cover.

From the attachment flange 41, the retaining fingers 40 extend generally radially and axially inwardly along the inner face of the cover marginal portion 38 to extend past the shoulder between the intermediate flange 15 and the terminal flange 16 of the tire rim, then diverging generally axially inwardly from the marginal cover portion 38 to provide resilient finger body extensions 43. At their inner extremities, the finger bodies 43 are provided with generally radially and axially outwardly turned reinforcing and bump engaging beads 44. The outside diameter described about the beads 44 is somewhat greater than the inside diameter described about the tips of the retaining bumps 19. As a result, the retaining finger beads 44 will cam over and snap behind the retaining bumps 19 when the cover is pressed home on the wheel, until the underturned marginal rib-like bead 39 of the cover bottoms against the radially extending portion of the terminal flange of the tire rim.

The retaining bead 44 preferably extends along the entire inner extremity of the retaining fingers 40 and merges cooperatively into side wing-like inwardly turned shoulder flanges 45 at the opposite sides of the fingers 40 abutting or back-up against the back of the cover marginal portion 38 similarly as the shoulder side flanges 28 of the retaining fingers 18. Hence the shoulder flanges 45 are substantially the same as and cooperate slidably with the marginal cover portion 38 the same as and to the same effect as the shoulder flanges 28 of the fingers 18 in association with the cover marginal portion 23.

In the modification of Figs. 8 and 9, the construction is substantially the same as that shown in Figs. 6 and 7, and all identical parts are therefore similarly identified. However, instead of providing a retaining bead at the inner terminals of the retaining fingers 40, an outturned extremity flange 47 is provided on each of the retaining fingers which is centrally subdivided into a plurality of short, stiff generally radially and axially outwardly extending retaining terminal flanges 48 which are retainingly engageable at their tips with the inner surface of the intermediate flange 15 intermediate retaining bumps 19 or where the intermediate flange is not provided with retaining bumps. Especially where tubeless tires are to be used on the tire rim, it may be desirable to avoid pressing retaining bumps in the intermediate flange, so as to avoid any possibility of fracturing of the metal and thus leakage of air from within the tire chamber of which the tire rim provides the inner wall in a tubeless tire arrangement.

The retaining finger terminal teeth 48 normally extend to a diameter which is slightly greater than the inside diameter of the intermediate flange 15 of the tire rim and more particularly the axially outer portion of such flange. Hence, when the cover is pressed axially inwardly onto the wheel, the finger teeth 48 are placed under resilient tensioned radially outwardly thrusting gripping endwise retaining engagement with the tire rim intermediate flange as the teeth are cammed radially inwardly and thus place the finger body 43 under resilient tension, enhanced by the side wing-like thrust flanges 45 backed up against the wheel body marginal portion 38. It will be observed that the side portions of the turned extremity flange or bead 47 which merge with the thrust flange portions 45 are continuous up to the outwardly arched, toothed portions of the extremity flange structure and thus assure thorough resilient tensioning of the retaining finger bodies in service.

Since the retaining finger teeth 48 have respective generally oppositely directed sharp terminal corners 49 which more or less bitingly engage the surface of the intermediate tire rim flange, turning of the cover on the wheel due to torque stresses will be effectively prevented.

In Fig. 10 is shown a modified wheel cover 50 which embodies retaining fingers 51 of somewhat similar construction as shown in Figs. 8 and 9 but constructed and arranged to engage retainingly with the terminal flange 16 of the wheel. To this end, the cover 50 comprises a central crown portion 52 with an intermediate annular dished portion 53 between the crown portion and an outer annular generally radially and axially outwardly sloping marginal portion 54 for overlying the terminal flange of the tire rim and having a turned hollow bead-like reinforcing and finishing edge 55 providing an underturned generally radially inwardly directed flange 57 for lying against the tip of the terminal flange of the tire rim in assembly. It is from the underturned flange 57 that the retaining fingers 51 extend generally axially inwardly as resilient extensions with side wing portions similarly as the side wing portions 45 in Fig. 8 thrusting in resiliency enhancing relation against the back of the radially outer cover portion 54. The extremities of the fingers 51 of the cover are turned to provide a generally radially and axially outwardly oblique cover retaining terminal flange which may be continuous or solid or may be subdivided into a plurality of individual finger terminals similarly to the finger terminals 48 in Fig. 8.

In applying the cover 50 to the outer side of the wheel, it is generally centered with respect to the wheel and pressed axially inwardly until the retaining terminals 58 snap behind the turned terminal edge of the terminal flange 16 into the radially inwardly facing groove defined by the terminal flange, the axially inward disposition of the cover being defined by engagement of the underturned marginal flange 57 with the tip of the terminal flange. To remove the cover 50 from the wheel a pry-off tool is applied behind the turned outer edge bead 55 and pry-off leverage exerted to withdraw the retaining fingers 51 from engagement with the terminal flange lip.

In Fig. 11 is shown a modification providing a cover 60 that is adapted to be applied to the outer side of a wheel of the kind having what is known as a safety rim. Such a wheel comprises a wheel body spider 61 carrying a tire rim provided with a base flange 62 attached to the wheel body and from which extends generally radially outwardly a side flange 63 merging with an intermediate generally axially outwardly directed intermediate flange 64 joining a terminal flange 65. At juncture of the intermediate flange 64 with the side flange 63 is a generally radially outwardly directed annular safety rib 67 which provides a generally radially inwardly opening annular groove 68.

The cover 60 includes a central crown portion 69 for overlying the wheel body 61 and having a generally axially inwardly dished annular juncture intermediate portion 70 joining the crown to a generally radially and axially outwardly directed annular outer marginal cover portion 71 for overlying the tire rim. An outer turned hollow reinforcing annular bead 72 at the radially outer extremity of the cover portion 71 has an underturned flange 73 adapted in assembly with the wheel to lie against the radially inner portion of the terminal flange 65. Extending from the underturned flange 73 is a plurality of retaining finger extensions 74 of a normal diameter less than the inside diameter of the intermediate flange 64 and having terminal generally radially outwardly projecting turned resiliently reinforced cover retaining beads 75. Normally the beads 75 project radially outwardly to a larger diameter than the inside diameter of the groove 68, and the fingers 74 are of a length to enable snapping of the retaining beads 75 into the groove 68 for retaining gripping engagement behind the overhanging generally axially inwardly facing shoulder at the axially outer side of the groove. At their opposite sides, the retaining fingers 74 are provided with resiliency enhancing thrust wing flanges similarly as the wing flanges 28 in the form of the invention shown in Fig. 3 and abutting the back of the annular outer cover portion 71.

In applying the cover 60 to the wheel, the cover is generally centered with respect to the wheel and the retaining terminal beads 75 of the retaining fingers are caused to cam in along the inner side of the intermediate flange 64 until they snap into retaining engagement within the groove 68. The arrangement is such that the fingers cam inwardly along the axially outer side of the groove and draw the underturned bead flange 73 at the outer margin of the cover snugly against the terminal flange of the tire rim. For removing the cover a pry-off tool is worked behind the outer marginal bead 72 and pry-off force applied to dislodge the retaining fingers from the groove in the tire rim.

In Fig. 12 is shown a cover 80 which is adapted for engagement with either retaining bumps or within a groove in a tire rim, and in any event for engagement behind a shoulder afforded for retaining the cover on the wheel. The cover 80 includes a circular inner portion 81 and a circular, annular outer portion 82 which extends radially and axially outwardly and thus provides a generally axially inwardly facing shoulder 82 adjacent to which retaining fingers 83 provided as generally axially inward extensions from an underturned marginal flange 84 abut or thrust through generally radially inwardly angled side wing portions 85. Under conditions where substantially greater resilient stiffness is desired than may be imparted by sliding wing flanges, such as 28 in Fig. 3, the radially angled side wing flanges 85 are adapted for substantially direct edgewise contact at least at the axially inner portions thereof with the surface 82 of the outer portion of the cover. The turned terminal portion of the fingers 83 may be either in the form of a turned bead or retaining finger flange, as desired. In the application of the cover to the wheel, the circumferentially arched intermediate portion of substantial width of the retaining fingers 83 will flex radially to snap over retaining shoulder means or to effect otherwise tensioned radially outward thrust engagement with the wheel part against which directed.

In the form of Fig. 13 a cover 90 is applied to the outer side of a wheel like that shown in Fig. 2. The cover 90 may comprise a one piece sheet metal plate provided with an inner portion 91, an intermediate dished annular portion 92 and a generally radially and axially outwardly sloping annular outer marginal portion 93 for overlying the tire rim. At its outer extremity the cover portion 93 has an underturned hollow finishing and reinforcing bead 94 affording an underturned generally radially inwardly directed flange portion 95 for resting against the terminal flange in assembly with the wheel.

Extending generally axially inwardly from the underturned flange 95 is a series of retaining fingers 97 provided with generally radially outwardly and axially inwardly projecting turned, bead reinforced resilient terminals 98 engageable in snap-on, pry-off relation with the retaining bumps 19 of the intermediate flange 15 of the tire rim. It will be understood that at the opposite sides the retaining fingers 97 have wing flange portions arranged to thrust in resiliency enhancing relation against the back of the annular outer cover portions 93.

For holding the cover 90 against turning on the wheel, the retaining fingers 97 or any of them may be provided with turn-preventing means such as struck-out lugs 31 as in the form of Figs. 2 and 3 or a bump receiving aperture as in the form of Fig. 5, the transversely and longitudinally arched form of the fingers 97 especially adapting the same for the apertured socket arrangement.

In Figs. 14–16, is shown a structure wherein a wheel substantially the same as the wheel of Fig. 2 has disposed at the outer side thereof a wheel cover 100 in which the retaining fingers are provided with a somewhat different means for reinforcing and enhancing the resiliency thereof at opposite sides of intermediate wheel-engaging portions of the fingers. To this end, the cover 100 has an inner, in this instance crown portion 101 for overlying the wheel body 11 having a dished annular juncture 102 with a generally radially and axially outwardly directed annular outer marginal cover portion 103 for overlying the tire rim. At its radially outer extremity the outer cover portion 103 is provided with a reinforced edge structure herein comprising a turned reinforcing and finishing bead 104 having an underturned flange portion 105 for abuttment against the tire rim terminal flange 16 in assembly with the wheel.

From the underturned flange 105 extends a series of generally axially inwardly projecting retaining fingers 107 for snap-on pry-off engagement with the retaining bumps 19. Each of the fingers 107 has a juncture flange portion 108 which may abut the radially outer portion of the inner face of the outer marginal cover portion 103 and extending generally radially inwardly clear of the shoulder at juncture of the intermediate and terminal flanges 15 and 16. Thence the fingers 107 extend axially inwardly on a diameter which is approximately the same as the diameter described by the tips of the retaining bumps 19. At their inner terminals the fingers 107 are preferably provided with outturned wheel engaging, retaining means in the form of a stiffly resilient bead 109 extending to an initial diameter greater than the diameter described about the tips of the retaining bumps 19 so as to be engageable in snap-on, pry-off relation behind the bumps 19. As will be observed from Fig. 16, the retaining fingers 107 are of substantial width and of transversely arched resiliency enhancing form generally conforming to the circumference of the cover. Moreover, the sides of the fingers flair laterally toward juncture with the underturned flange 105.

In order to afford resiliency enhancing, reinforcement for the opposite sides of the retaining fingers 107, means are provided, herein comprising respective pairs of circumferentially spaced projections 110 from the cover portion 103. In a convenient form, the back-up projections 110 are pressed in from the plane of the cover portion 103 in the form of generally radially extending rib-like formations having rigid shoulders 111 opposing the radially inner faces of the side portions of the adjacent finger 107 while leaving a substantial intermediate portion of the finger free to flex axially inwardly as the finger is cammed over one of the bumps 19 on the wheel.

With the finger back-up arrangement of the cover 100 a substantial range of resiliency control in the fingers 107 can be attained by spacing of the back-up projections 110. That is, if the back-up projections 110 are fairly closely spaced as shown in Fig. 16, they provide back-up fulcrums more closely adjacent to the transverse center of the fingers and thus afford substantially stiff resilient resistance to radially inward deflection of the intermediate cover-engaging portion of the finger. Greater spacing of the back-up projections or shoulders affords proportionately softer resilience in the cover-engaging terminal portion of the retaining fingers 107. Moreover, while the retaining shoulders 111 may be so related to the fingers 107 that they are at all times in direct contact with the backs of the fingers, it will be appreciated that initially there may be some space between the shoulders 111 and the backs of the fingers so as to afford reasonably easy resilience during the initial radially inward deflection of the fingers, with the fingers backing up against the shoulders 111 after a limited amount of free inward resilient deflection.

In Figs. 17–19, is shown an arrangement wherein a cover 120 is constructed for disposition at the outer side of a vehicle wheel including a wheel body 121 provided with an outer marginal attachment flange 122 secured to a base flange 123 of a tire rim that has a side flange 124, an intermediate flange 125 and a terminal flange 127. In this instance the wheel cover 120 has a central crown portion 128 bordered by an axially outwardly extending annular reinforcing rib 129 and having an axially inwardly dished annular juncture 130 with a generally radially and axially outwardly sloping outer marginal annular cover portion 131 for overlying the tire rim.

At its outer margin the outer cover portion 131 has an annular reinforcing and finishing formation, herein in the form of a hollow rib-like bead 132 provided with an underturned flange portion 133 for engagement with the outer side of the terminal flange 127.

For retaining the cover 120 on the wheel, the tire rim is provided on the axially outer portion of the intermediate flange 125 with respective pairs of spaced retaining bumps 134 disposed in groups equidistantly spaced about the intermediate flange 125, such groups comprising three or four, as may be preferred. For engaging in snap-on, pry-off relation with the pairs of bumps 134, respective inwardly directed retaining finger extensions 135 are provided on the flange 133.

In view of the spaced relation of the retaining bumps 134, the retaining fingers 135 must, of course, be of substantial width, and increased reinforcement is provided for attaining desirable enhanced resilience in the retaining fingers. To this end each of the retaining fingers comprises a generally axially inwardly extending body portion 137 to extend freely past the outer portion of the intermediate flange 135 and of a width to span the retaining bumps 134 and extend substantially therebeyond at each side of the respective retaining fingers. At their inner extremities the retaining fingers are provided with bump-engaging generally radially outwardly directed fairly stiffly resilient terminals 138 in the form of a turned bead-like structure.

For imparting resilient stiffness to the retaining fingers 135, the opposite sides of the fingers are provided with reinforcing means such as angularly directed wing portions 139 which may slidably thrust facewise against the back of the cover portion 131. In addition, the fingers 135 are provided, intermediate the portions thereof which will engage one of the pair of bumps 134, with additional reinforcing means, in the present instance comprising a longitudinal rib-like radially inwardly indented shoulder structure 140 which may be in the form of a reinforcing rib spaced from the back of the cover portion 131 but in this instance backing up against the cover portion in shouldering, thrusting relation, at least when the retaining finger terminal 138 is in radially inwardly deflected cover-retaining engagement with the bumps 134.

In applying the cover 120 to the wheel, a valve stem aperture 141 is registered with a valve stem 142 and the cover then pressed axially inwardly to snap the retaining fingers 135 into engagement with the retaining bumps 134. Pry-off is effected by inserting a pry-off tool behind the outer finishing bead 132 of the cover, preferably between a pair of the bumps 134 and pry-off leverage applied. In prying the cover from the wheel in this manner the pry-off tool can be worked into the depression afforded centrally of the retaining finger 135 by the indented reinforcing, reversely arched portion 140 of the finger.

To hold the cover against turning on the wheel, at least one of the retaining fingers 135 may be provided with a pair of struck-out oppositely facing turn-preventing lugs 143. As shown, these lugs are provided at the opposite sides of the reinforcing central indentation 140 so as to be located, in assembly, between the two bumps 134 with which the finger flange 135 is in engagement. It will be clear, however, that the turn-preventing bumps could as well be provided at the remote sides of the retaining bumps and directed toward the bumps so as to hold the cover against turning in either direction. However, since the central portion of the finger is somewhat stiffer, due to the reinforcing indentation 140, the better location for the turn-preventing lugs 143 is as shown.

In all forms of the invention highly effective tensioned engagement of the retaining finger structures with the cooperating portions of the wheel is assured. Substantial manufacturing tolerances both in production of the covers, and more particularly in production of the retaining finger structures, as well as in the associated, engaged portions of the wheel, are effectively accommodated.

Any form of the cover may be made from a single sheet metal blank economically, using corner material of a polygonal blank, but, on the other hand, the body of the cover may be made separately from the retaining fingers, which enables the use of different materials for the cover body and the retaining fingers, selected for special advantages for the respective uses to which put.

Although the reinforcing or reinforced side portions of the several retaining finger flanges may be constructed and related to the opposing cover portion for constant interengagement, it will be clear that in any form disclosed back-up contact between the finger sides and the cover may occur only after the finger is placed under resilient deflection incident to engagement with the wheel. Moreover, it will be appreciated that where the fingers have reinforcing means thereon such as angular flanges or wings or rib structure, substantial resilient stiffness is afforded in the fingers without or before back-up contact with the back of the cover.

In the resilient deflection of the wheel engaging areas of the finger flanges incident to engagement with the contacted wheel part, the circumferentially spaced or offset resiliency enhancing areas of the finger flanges are movable in a circumferential direction and thereby permit resilient yielding of intermediate portions of the finger flange terminals about generally axial as well as circumferentially directed axes.

It will be understood that modifications and variations may be effected without departing from the scope of the novel concepts of the present invention.

I claim as my invention:

1. In a wheel structure including a portion facing generally radially, a cover for disposition at the outer side of the wheel having a portion with generally axially extending retaining finger structure thereon provided with means for retainingly engaging said radially facing wheel portion, and side shoulder flanges on the fingers thrusting in backed-up relation against an adjacent portion of the cover.

2. In a wheel structure including a portion having a generally axially outwardly facing surface and an adjacent axially inwardly extending and generally radially inwardly facing surface, a cover for disposition at the outer side of the wheel having a portion for overlying said wheel portion and provided behind said cover portion with a shoulder engageable with said axially facing surface and a retaining flange structure extending generally axially inwardly divergently to said wheel cover portion and providing means retainingly engageable with a portion of said radially facing surface, said retaining flange structure having portions thereof at opposite sides of said retaining means thrusting in flange tensioning relation against said cover portion.

3. In a wheel structure including a portion having a generally axially outwardly facing surface and an adjacent axially inwardly extending and generally radially inwardly facing surface, a cover for disposition at the outer side of the wheel having a portion for overlying said wheel portion and provided behind said cover portion with a shoulder engageable with said axially facing surface and a retaining flange structure extending generally axially inwardly divergently to said wheel cover portion and providing means retainingly engageable with a portion of said radially facing surface, said retaining flange structure having portions thereof at opposite sides of said retaining means thrusting in flange tensioning relation against said cover portion, said retaining means comprising a turned terminal on said flange structure.

4. In a wheel structure including a portion having a generally axially outwardly facing surface and an adjacent axially inwardly extending and generally radially inwardly facing surface, a cover for disposition at the outer side of the wheel having a portion for overlying said wheel portion and provided behind said cover portion with a shoulder engageable with said axially facing surface and a retaining flange structure extending generally axially inwardly divergently to said wheel cover portion and providing means retainingly engageable with a portion of said radially facing surface, said retaining flange structure having portions thereof at opposite sides of said retaining means thrusting in flange tensioning relation against said cover portion, said retaining means comprising a turned terminal on said flange structure, said turned terminal being directed generally radially toward said radially facing portion of the wheel and engageable with radially projecting retaining bumps thereon.

5. In a wheel structure including a portion having a generally axially outwardly facing surface and an adjacent axially inwardly extending and generally radially inwardly facing surface, a cover for disposition at the outer side of the wheel having a portion for overlying said wheel portion and provided behind said cover portion with a shoulder engageable with said axially facing surface and a retaining flange structure extending generally axially inwardly divergently to said wheel cover portion and providing means retainingly engageable with a portion of said radially facing surface, said retaining flange structure having portions thereof at opposite sides of said retaining means thrusting in flange tensioning relation against said cover portion, said retaining means comprising a turned terminal on said flange structure, said turned terminal being subdivided into a plurality of angled retaining teeth which engage said radially facing surface grippingly.

6. In a cover for disposition at the outer side of a vehicle wheel, a circular cover body having a portion thereof provided therebehind with a circumferentially spaced series of generally axially inwardly extending retaining flange fingers having circumferentially spaced side portions thereof backed against said cover portion and an intermediate portion spaced from the cover portion and free to flex radially for retaining engagement with a wheel part.

7. In a wheel cover, a cover body having an annular marginal portion provided therebehind with a plurality of circumferentially spaced retaining fingers, said retaining fingers having their axially outer ends connected to said marginal portions and generally axially inwardly directed resilient retaining portions with angularly related circumferentially spaced side portions backed in tensioning relation against said cover portion.

8. In a wheel cover, a cover body having an annular marginal portion provided therebehind with a plurality of circumferentially spaced retaining fingers, said retaining fingers having their axially outer ends connected to said marginal portions and generally axially inwardly directed resilient retaining portions with angularly related circumferentially spaced side portions backed in tensioning relation against said cover portion, said retaining fingers being formed as integral underturned extensions in one piece with an underturned annular flange on said cover portion.

9. In a wheel cover, a cover body having an annular marginal portion provided therebehind with a plurality of circumferentially spaced retaining fingers, said retaining fingers having their axially outer ends connected to said marginal portions and generally axially inwardly directed resilient retaining portions with angularly related circumferentially spaced side portions backed in tensioning relation against said cover portion, said side portions comprising wing flanges engaging the back of said cover portion.

10. In a cover for disposition at the outer side of a vehicle wheel, a circular portion on said cover having therebehind a cover retaining finger, said finger including a body having a portion of substantial width on said annular cover portion and an intermediate finger body portion diverging from said cover portion and providing a resilient engagement structure cooperable with a portion of a wheel to retain the cover thereon, said finger body having side shoulder flanges angled from said intermediate portion and backed against said annular cover portion.

11. In a cover for disposition at the outer side of a vehicle wheel, a circular portion on said cover having therebehind a cover retaining finger, said finger including a body having a portion of substantial width on said annular cover portion and an intermediate finger body portion diverging from said cover portion and providing a resilient engagement structure cooperable with a portion of a wheel to retain the cover thereon, said finger body having side shoulder flanges angled from said intermediate portion and backed against said annular cover portion, said shoulder portions having sliding bearing engagement with said annular cover portion.

12. In a cover for disposition at the outer side of a wheel, a cover portion for overlying a wheel portion, and retaining means behind said cover portion including a retaining flange structure having a portion of substantial width with opposite side portions in backed up relation to the cover portion and an intermediate portion extending in spaced relation from the cover portion and retainingly engageable with the wheel portion.

13. In a cover for disposition at the outer side of a vehicle wheel, a circular cover member having a generally axially inwardly extending substantially concealed circumferentially spaced plurality of circumferentially arcuate finger flanges arranged in a circle, said finger flanges having respective areas thereof radially resiliently deflectable upon contact with a wheel surface, and areas on said finger flanges offset in circumferential direction from and engaging said cover member for enhancing the resiliency of said respective areas and movable in circumferential direction upon deflection of said respective areas.

14. In a wheel structure having tire rim and body parts with a portion on one of said parts facing generally radially on a predetermined diameter, a circular cover for dispostion at the outer side of the wheel, said cover having inwardly extending generally concealed circumferentially spaced and arcuate flanges arranged in a circle normally of a different diameter than that of said annular wheel portion so as to be retainingly engageable therewith, each of said flanges having a first area resiliently deflectable radially upon contact with said wheel portion, and adjoining circumferentially spaced second areas on said flanges engageable with the cover and movable in a circumferential direction upon deflecting of said first area and acting to reinforce and enhance the resilient deflectability of said first area.

15. In a wheel structure having tire rim and body parts with a portion on one of said parts facing generally radially on a predetermined diameter, a circular cover for disposition at the outer side of the wheel, said cover having inwardly extending generally concealed circumferentially spaced and arcuate flanges arranged in a circle normally of a different diameter than that of said annular wheel portion so as to be retainingly engageable therewith, each of said flanges having a first area resiliently deflectable radially upon contact with said wheel portion, and adjoining circumferentially spaced second areas on said flanges engageable with the cover and movable in a circumferential direction upon deflecting of said first area and acting to reinforce and enhance the resilient deflectability of said first area, said second areas comprising side wing flanges on said arcuate flanges angled generally radially toward the back of the cover and joining a continuous annular underturned flange on the cover from which said arcuate flanges extend.

16. In a wheel structure including a part having a generally radially facing annular surface, a circular cover for disposition at the outer side of the wheel having an annular portion to lie generally opposite and in adjacent spaced relation to said annular wheel surface, the cover having behind said annular portion a retaining flange portion divergent relative to said annular portion and provided with retaining terminal structure engageable under resilient tension of the flange portion with said annular wheel surface, and one of said cover portions having generally radially extending and substantially circumferentially spaced projections engageable in shouldering back-up interengagement at circumferentially spaced points against the other of said cover portions to leave therebetween and resiliently flexible and spaced from the annular cover portion a substantial area of said retaining flange portion and said retaining terminal structure.

17. In a wheel structure including a generally radially facing annular portion, a cover for disposition at the outer side of the wheel including a cover body having a portion for overlying said wheel portion and extending in radially spaced general opposition to said wheel portion, and a cover retaining finger carried by said cover portion therebehind and projecting generally axially and being generally radially resiliently yieldable, said finger having a terminal portion with a central part thereof retainingly engageable with said wheel portion and side portions of the terminal engageable in tensioning back up relation against said cover body portion while the central terminal part retainingly engages said wheel portion.

18. In a wheel structure including a generally radially facing annular portion, a cover for disposition at the outer side of the wheel including a cover body having a portion for overlying said wheel portion and extending in radially spaced general opposition to said wheel portion, and a cover retaining finger carried by said cover portion therebehind and projecting generally axially and being generally radially resiliently yieldable, said finger having a terminal portion with a central part thereof retainingly engageable with said wheel portion and side portions of the terminal engageable in tensioning back up relation against said cover body portion while the central terminal part retainingly engages said wheel portion, said central terminal part projecting radially beyond the plane of the finger toward the wheel portion and the back up terminal portions projecting radially beyond the plane of the finger toward the cover portion.

19. In a cover for disposition at the outer side of a vehicle wheel, a circular cover body having an underturned marginal flange from which project generally axially inwardly behind the cover a plurality of circumferentially spaced cover retaining fingers of sheet metal resiliently deflectable radially and provided with terminals having central retaining portions for engagement with a wheel part and side portions of the terminals for back up engagement against an adjacent portion of the cover to enhance the resiliency of the fingers during engagement of the retaining terminal portions with a wheel part.

20. In a cover for disposition at the outer side of a vehicle wheel, a circular cover body having an underturned marginal flange from which project generally axially inwardly behind the cover a plurality of circumferentially spaced cover retaining fingers resiliently deflectable radially and provided with terminals having central retaining portions for engagement with a wheel part and side portions for back up engagement against an adjacent portion of the cover to enhance the resiliency of the fingers during engagement of the retaining terminal portions with a wheel part, said fingers comprising homogeneously integral extensions from said underturned flange and possessing inherent resiliency normally causing the fingers to spring away from said cover portion.

21. In a cover for disposition at the outer side of a vehicle wheel, a circular cover body having an underturned marginal flange from which project generally axially inwardly behind the cover a plurality of circumferentially spaced cover retaining fingers resiliently deflectable radially and provided with terminals having central retaining portions for engagement with a wheel part and side portions for back up engagement against an adjacent portion of the cover to enhance the resiliency of the fingers during engagement of the retaining terminal portions with a wheel part, said fingers comprising homogeneously integral extensions from said underturned flange and possessing inherent resiliency normally causing the fingers to spring away from said cover portion, said finger terminals having the central engagement and side back up portions thereof relatively offset in opposite radial directions.

22. In a wheel structure including a wheel body and a tire rim having an intermediate generally radially inwardly facing annular flange, a cover for disposition at the outer side of the wheel for substantially overlying the wheel body and the tire rim and having an annular intermediate portion for lying in radially inwardly spaced relation opposite the terminal flange, and a plurality of generally axially inwardly extending sheet metal retaining fingers on the cover behind the portion thereof that overlies the tire rim and extending axially inwardly along said intermediate portion of the cover, said retaining fingers having retaining terminal portions thereof engageable retainingly with said intermediate flange and normally spaced from said intermediate cover portion and resiliently radially flexible relative thereto and relative to the intermediate flange of the tire rim, said fingers having lateral portions thereof engageable in backup relation with the intermediate portion of the cover to enhance the resilient retaining engagement of the retaining terminal portions of the retaining fingers with the intermediate flange.

23. In a cover for disposition at the outer side of a vehicle wheel, a circular cover member having behind its radially outer margin a continuous annular flange including a plurality of circumferentially spaced cover member retaining finger flange extensions therefrom of substantial width projecting generally axially inwardly away from the cover member and facing generally radially outwardly, said finger flange extensions having cover retaining terminal means engageable under resilient tension of the finger extensions against an opposing wheel portion, and resiliency enhancing reinforcing portions on the respective opposite sides of body portions of said finger flange extensions and turned angularly relative to said body portions and projecting generally radially inwardly toward the cover member, said radially projecting reinforcing portions merging at their axially outer ends with said annular flange for thus enhancing the resiliency and reinforcing function thereof.

References Cited in the file of this patent

UNITED STATES PATENTS

| | | |
|---|---|---|
| 2,199,889 | Lyon | May 7, 1940 |
| 2,368,228 | Lyon | Jan. 30, 1945 |
| 2,607,633 | Lyon | Aug. 19, 1952 |
| 2,624,628 | Lyon | Jan. 6, 1953 |
| 2,624,634 | Lyon | Jan. 6, 1953 |
| 2,669,487 | Horn | Feb. 16, 1954 |
| 2,675,272 | Hautau | Apr. 13, 1954 |